March 29, 1949.　　　M. N. YARDENY　　　2,465,956
INTEGRATING CONTROL DEVICE
Filed Feb. 11, 1946　　　　　　　　　　　3 Sheets-Sheet 1
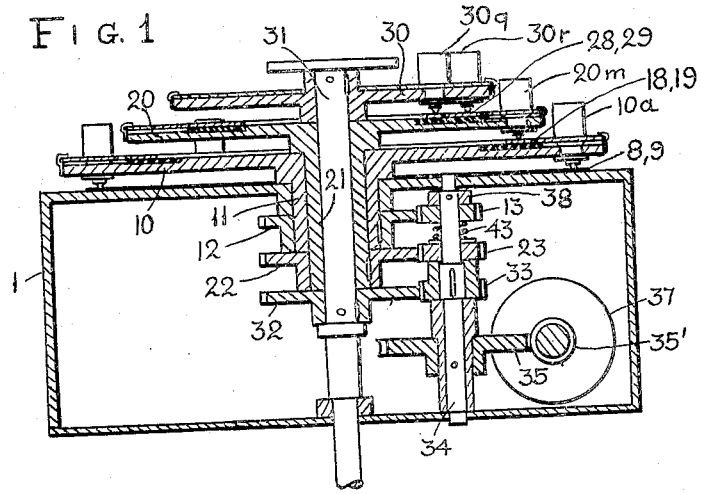
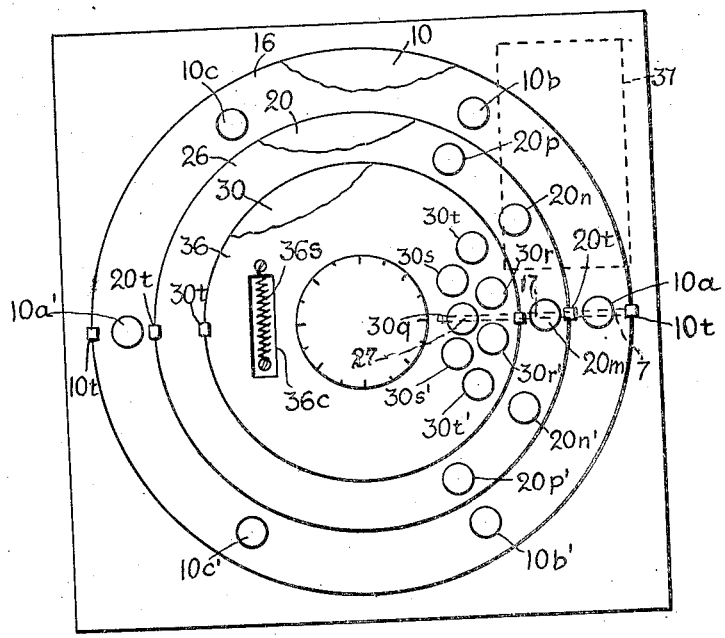
MICHEL N. YARDENY
INVENTOR.
BY
　　　Frederick E. Ham
　　　　ATTORNEY

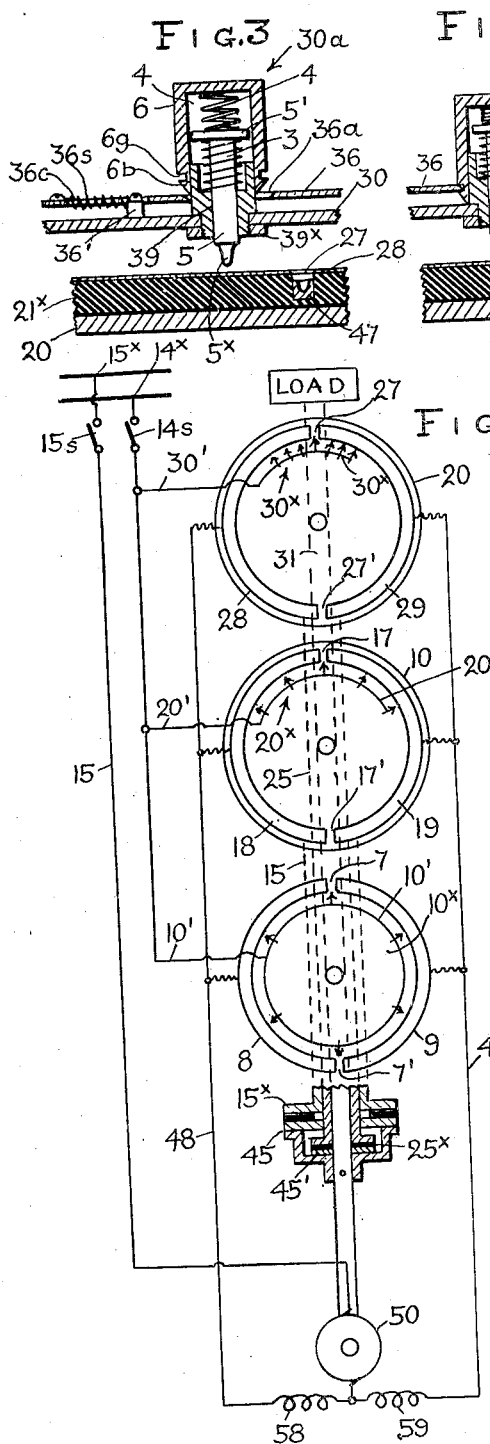
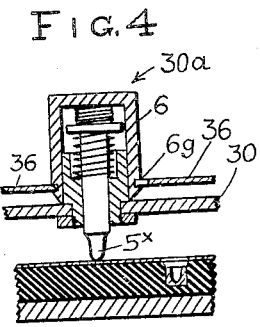
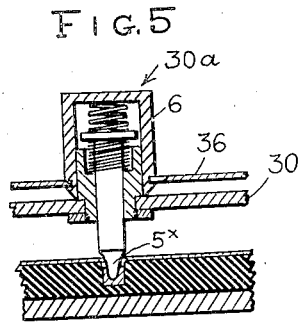
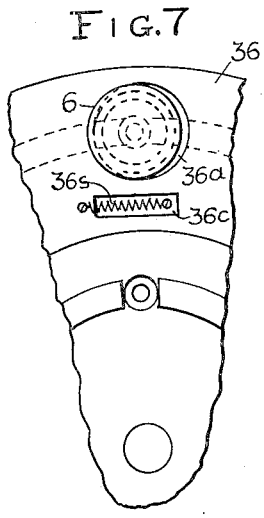
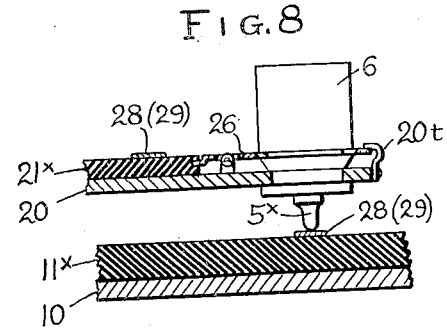

March 29, 1949.
M. N. YARDENY
2,465,956
INTEGRATING CONTROL DEVICE
Filed Feb. 11, 1946
3 Sheets-Sheet 3
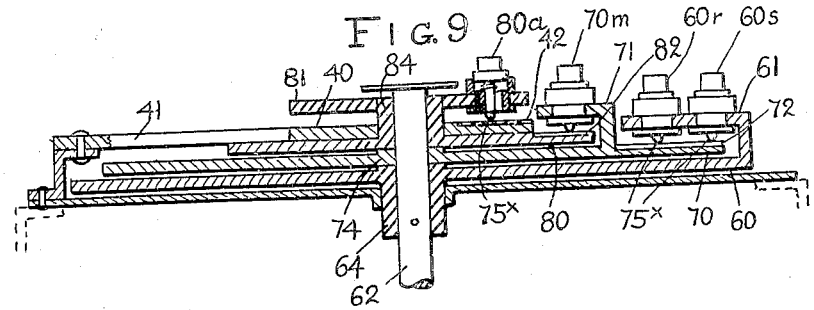
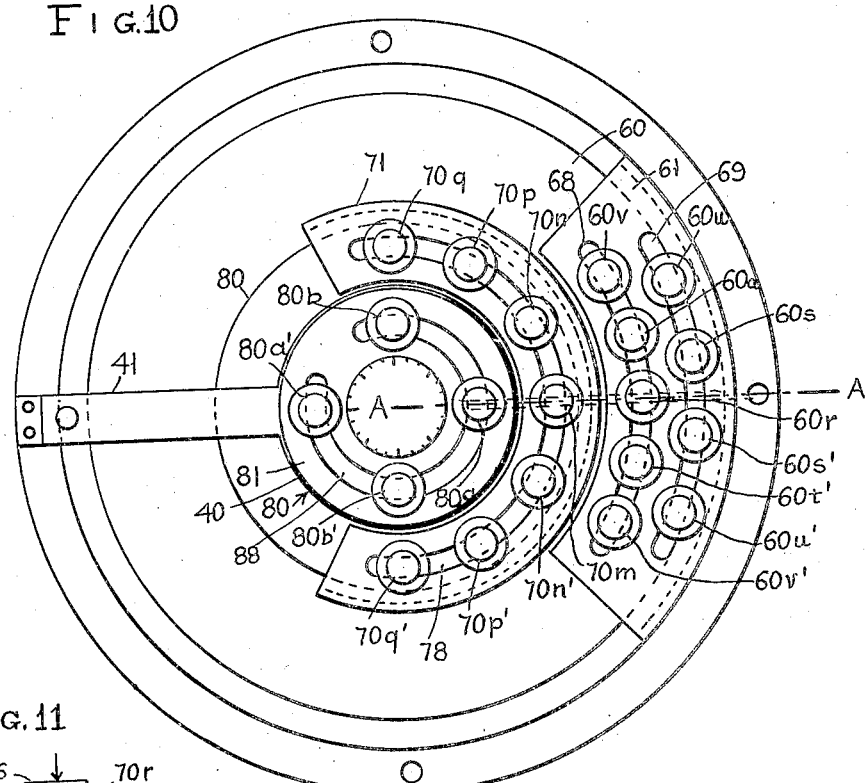
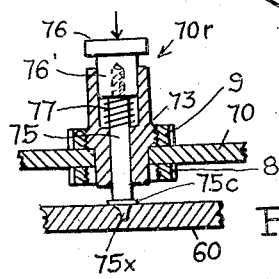
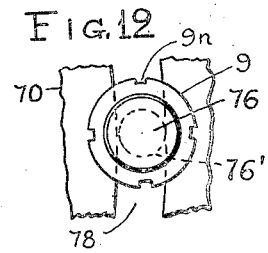
INVENTOR.
MICHEL N. YARDENY
BY
ATTORNEY Patented Mar. 29, 1949

2,465,956

UNITED STATES PATENT OFFICE 2,465,956

INTEGRATING CONTROL DEVICE

Michel N. Yardeny, New York, N. Y.

Application February 11, 1946, Serial No. 646,953

5 Claims. (Cl. 318—31)

This invention relates to devices for placing a load at predetermined positions, either by the energization of an electric motor or by direct mechanical movement, and more particularly relates to positioning devices of the type known as "integrating," which are adapted to accommodate a large number of predetermined load positions.

One of the objects of the invention is to provide integrating positioning device of the character described which comprises relatively few parts, is compact and may be cheaply produced, and which will provide for a large number of load positions compared to existing devices of this character. An allied object is to provide a positioning device of the character described which will control a driving electric motor; a second allied object is to provide a positioning device of the character described which directly moves the load to the desired positions without the use of an electric motor or other prime mover. For the attainment of the foregoing and such other objects as may appear or be pointed out herein, I have shown an embodiment of the electric motor type of improved integrating positioning device and of the direct mechanical form thereof in the accompanying drawings, wherein:

Fig. 1 is a sectional elevation through the motor type of improved device;

Fig. 2 is a top view thereof;

Fig. 3, 4 and 5 are detailed views in sectional elevations of the control button showing the button in each of its three possible positions as follows: Fig. 3 shows the button in normal elevated position: Fig. 4 shows it in position of making electrical contact, and Fig. 5 shows the button in stopping position;

Fig. 6 is a diagrammatic illustration of the electrical circuits contained in the improved motor type of position device;

Fig. 7 is an enlarged view of the fragmentary operation of the device showing more particularly the locking ring;

Fig. 8 is a sectional view taken substantially on the line 8—8 of Fig. 7;

Fig. 9 is a sectional elevation of the mechanical version of the improved positioning device;

Fig. 10 is a plan view thereof;

Fig. 11 is an enlarged detail in sectional elevation of the button structure employed in the device of Figs. 9 and 10;

Fig. 12 is a plan view, also enlarged, of the button shown in Fig. 11.

Referring first to the motor type of improved positioning device shown in Figs. 1 to 8, the embodiment there shown is adapted to position a load by manipulation of three sets of control buttons. It will be understood that the invention may be applied to a positioning device having a greater or lesser number of sets of control buttons, and that such buttons may be spaced in any desired manner, those shown more particularly in Fig. 2 are merely for illustrative purposes and for facility in description.

The aforesaid three sets of control buttons are carried on three separate discs, the outer one of which is designated 10, the middle disc 20 and the inner disc 30. There are shown on the outer disc, six buttons designated 10a, 10b, 10c, 10a', 10c' and 10b'. The six control buttons of the outer disc 10 divide the 360° of a circle into 60° divisions, hence manipulation of selected ones of the outer circle buttons will position the load 60° or a multiple thereof, in either or clockwise or counterclockwise direction, as will be explained more particularly hereinafter.

The middle disc 20 is provided, for illustrative purposes, with twelve buttons, only a few of which are shown in Fig. 2 and are designated 20m, 20n, and 20p, in a counter-clockwise direction, and 20m', 20p'. The twelve buttons of the middle disc therefore divide each of the aforesaid 60° divisions of the outer circle 10 into two 30° secondary divisions, so that manipulation of button 20n will cause a counterclockwise rotation of the load of 30°. The integrating nature of the device is therefore apparent inasmuch as manipulation of one of the buttons of the outer disc 10, for example, button 10b, together with the manipulation of one of the buttons of the middle disc 20, for example, button 20n, will cause a load movement which is an integration of the movement of both the outer and the middle discs which, in the example taken, is a summation of 60° (movement of the outer disc) and 30° (movement of the middle disc).

This principle of integration is carried further in the third inner disc 30 which is divided into sub-divisions of the preceding middle disc 20; more particularly, each of the 30° secondary divisions of the middle disc is divided in the inner disc into three tertiary divisions, each of a value of 10°. The buttons of the inner disc are designated 30q, 30r, 30s, 30t in a counter-clockwise direction, 30r', 30s', and 30t'.

The inner disc 30 is secured at the upper end of a vertical shaft 31 which extends into, and is rotatably mounted in, a housing 1. The middle disc 20 is secured to a bushing 21 which is rotatably mounted on the said shaft 31; the outer disc 10 is secured to a somewhat shorter bushing 11 which is rotatably mounted on the outside of the aforesaid bushing 21 and is likewise rotatably mounted. On the vertical shaft 31 is secured a gear 32 which meshes with a pinion 33 which is secured to rotate with a vertical spindle 34 also rotatably mounted in a housing 1. Also secured to the vertical spindle 34 is a worm gear 35 which meshes with the worm 35' on the motor shaft of load motor 37.

Secured at the lower ends of the inner bushings 21 is a gear 22 meshing with a pinion 23 which is rotatably mounted on the aforementioned vertical spindle 34; secured to the lower end of the outer bushing 11 is a gear 12 meshing with a pinion 13 likewise rotatably mounted on a vertical spindle 34. Secured to rotate with the spindle 34 is a collar 38, one face of which is in frictional engagement with one of the pinion 13; one face of the rotatably mounted pinion 23 is in frictional engagement with one face of the pinion 33 which is, as described, secured to rotate with the vertical spindle 34. Interposed between the rotatably mounted pinions 13 and 23 is a compression coil spring 43 which is effective to maintain the two pinions in frictional driving contact, with respectively the collar 38 and the pinion 33.

An enlarged detail of the control buttons is shown in Figs. 3, 4, and 5, in which is shown button 30a associated with the inner disc which is associated with the inner disc 30. As seen in these figures, the button 30a in the example taken, is mounted on the control disc 30 in the example shown, by means of a bushing 39 which is secured to the control disc 30 as by means of a lock nut 39x which is screwed on external threads of the bushing. Within the bushing 39, is an axially slidable spindle 5, the lower end of which is pointed to provide a contact and locking dog 5x. The upper end of spindle 5 may be provided with a flange 5' which is slidable in the button shell 6 is a coil compression spring 4 which tends to urge the spindle outwardly.

Underlying the inner disc 30 shown in detail in Figs. 3–5 is the middle disc 20, which unlike the inner disc 30, is provided with an upper insulating material 21x, upon which is secured certain electrical contacting elements which are better described with reference to Fig. 6.

Referring now to Fig. 6, each of the discs other than the inner disc 30, namely the inner disc 20, and the outer disc 10 are each provided with a pair of electrical conducting elements which as shown in Fig. 6, are in the form of segments. The pair of electrical conducting segments carried by the middle disc 20 are designated 28 and 29, the adjacent ends of which are separated by gaps 27, 27'; the pair of electric conducting segments of the outer disc 10 are designated, correspondingly 18, 19, and are separated by gaps 17, 17'; the third or inner disc 30 has no conducting elements; its control buttons such as 30q, 30r shown in Fig. 1, are engageable with the conducting segments 28, 29 carried by the underlying middle disc 20. The buttons of the middle disc such as the button 20m, are engageable with the conducting segments 18, 19 of the underlying outer disc 10; the buttons of the outer disc, such as button 10a shown in Fig. 1, is engageable with similar conducting elements 8, 9 carried on the top surface of the housing 1. As best shown in Fig. 6, the stationary conducting segments 8, 9, are separated by gaps 7, 7'. The control buttons are diagrammatically shown in Fig. 6, the control buttons 30q, 30r, 30s, 30t, etc. associated with the inner disc 30 as shown in Figs. 1 and 2, are collectively designated 30x in Fig. 6; the control buttons 20m, 20n, 20p, etc. of the middle disc 20 diagrammatically shown in Fig. 6 and designated generally 20x; the buttons 10a, 10b, 10c, etc. are designated 10x in Fig. 6.

The corresponding segments 28, 18, and 8 are connected by a common lead 48 to the outer terminal of field winding 58 of load motor 50, while the other segments 29, 19, and 9 are connected by a common lead 49 to the outer terminal of the other field winding 59. The control buttons generally designated 30x in Fig. 6 are connected by a lead 30' to wire 14 leading through a switch 14s to one terminal 14x to the source of supply. Control buttons 20x are connected by short lead 20' to the aforesaid supply wire 14, and the control buttons 10x are connected by a lead 10' to the supply wire 14. The other terminal 15x of the source of supply is connected through switch 15s to a wire 15 which leads through the armature of load motor 50 to the inner common terminals of field windings 58, 59. The motor connections are such that the discs are always rotated in a direction for bringing together the depressed button and the respective gap.

The gear transmissions shown in Fig. 1, and previously described, including inner shaft 31 and the vertical spindle 34, are shown somewhat schematically in Fig. 6 wherein the gears for the respective three control discs are not shown, but in which the drive connections are shown coming off directly from the lead shaft 31. Encircling the shaft 31 is a tubular shaft 25, the upper end of which is secured to the center disc 20, the lower end of which terminates in a flange 25x. Encircling the tubular shaft 25 is a larger tubular shaft 15' the upper end of which is secured to the outer disc 10, the lower end of which terminates in a flange 15x. Cooperative with the said flanges 25x (of the inner tubular shaft 25) and the flange 15x (of the outer tubular shaft 15') are a pair of flange members 45, 45' secured to rotate with the inner shaft 31.

To explain the operation of the improved positioning device, let it be assumed that the gaps, more particularly, 27, 17, and 7 of the respective middle disc 20, outer disc 10, and of the stationary segments 8, 9, are aligned with the buttons designated, respectively, 10a, 20m, and 30q. In this position of the afore enumerated buttons, a circuit to motor 50 will be broken at their respective gaps 27, 17, 7. Let it be assumed that the load is to be positioned for 100° rotation in clockwise direction as viewed in Fig. 2. To attain this load position, the following buttons are depressed; button 10b of the outer control disc which will cause, a 60° clockwise rotation; button 20n of the middle disc, which will cause an additional 30° clockwise rotation; and button 30r, which will cause a further clockwise rotation of 10°. The total of the foregoing angular turning inaugurated by the respective discs is therefore 60° plus 30° plus 10° or a total of 100°, all clockwise. Depression of any one of the aforementioned buttons 10b, 20n, or 30r will release the button previously depressed in the respective control discs, for example, depression of button 30a, Fig. 3, will release the previously depressed button of the inner disc 30, and will also lock depressed button 30a in the position shown in Fig. 4, with the pointed end 5x of its spindle in contact with either of the segments 27, 29 of the underlying middle disc 20.

Clockwise load rotation having been taken in the example, the depressed button 10b of the outer disc 10 will engage segment 8 (see Fig. 6) of the stationary segments 8, 9, which is effective, by energization of motor winding 58, to cause clockwise motor rotation. Similarly, the striking of button 20n of the middle disc 20 will result in engagement of that button with conducting segment 18, see Fig. 6, of the outer control disc 10, which, like stationary segment 8 is effective to energize motor winding 58 for clockwise motor rotation. Finally, depression of key 30r of the inner disc 30 will cause engagement of that button with a segment 28 of the middle disc, which, like segments 8, 18, causes clockwise motor rotation.

By reason of the direct drive to the inner control disc, through the meshing gears 33, 32, Fig. 1, and the frictional drive between vertical spindle 34 and the middle disc (by frictional contact between gears 23, 33, and the meshing of gear 22 with gear 23), and the frictional drive of the vertical spindle 34 between collar 38 on the vertical spindle 34 and the gear 13 which meshes with gear 12, all of the discs will turn clockwise in unison. Hence, there will be no relative motion between the depressed buttons and the associated gaps of the respective discs, other than the movement of the outer disc 10, or rather its depressed button 10b, relative to the gap 7 separating the stationary segments 8, 9, secured on the housing 1. Clockwise turning of all the discs in unison will continue until the depressed button 10b of the outer disc 10 reaches the gap 7 separating the stationary segments 8, 9, whereupon the circuit from supply terminal 14x connected to the outer disc 10 will be broken at the gap 7, so that no current will be supplied to the motor through the segments, 8, 9. Also upon the depressed button 10b reaching the gap 7, it will be positively locked in the gap to prevent further rotation of the disc, which disc-locking position is shown in Fig. 5.

As best shown in the detailed Figs. 3–5, the insulation 21x underlying the 27 separating conducting segments 28, 29 is recessed to provide a cavity in which the pointed end 5x of the button may be received. In order to positively hold the button in precise position within the cavity, there is embodied a metal insert 47 which has the same contour as that of the pointed end of the button spindle.

The locking of button 10b of the outer disc 10 in the gap 7 separating the stationary segments 8, 9 will now cause the outer disc 10 to be held stationary so that it will present a stationary pair of segments, to wit, 18, 19 to the depressed button of the overlying middle disc 20.

The continued unison rotation of the middle and inner discs 20, 30 by the frictional drive, as described above, is made possible by the slippage between the pinion 13, see Fig. 1, and the collar 38 which is secured to the driving spindle 34. The same slippage occurs in the diagrammatic showing of Fig. 6 between the flange 15x associated with, and secured to rotate with, the outer disc 10, and the driving flange 45 secured to rotate with the driving shaft 31.

The gaps of the other two discs, more particularly, gap 17, separating the segments 18, 19, carried by the outer disc 10 and the gap 27 separating the segments 28, 29 carried by the middle disc 20, will be turned in a clockwise direction by the aforementioned unison rotation of the discs relatively to the now stationary gap 17 of the outer disc 10. Clockwise rotation of the middle and inner discs continues until the depressed button 20n, see Fig. 2, reaches the gap 17 separating the conducting segments 18, 19, of the outer disc 10. As a result of the first movements of all three discs in unison, the load is moved an angle of 60°; the further rotation of the middle and inner discs in unison will move the load an additional 30° so that as a result the load a total of both movements, the load is moved a total angle of 90°. By the locking of button 20n in the gap 17 of the outer disc, the middle disc 20 will now be held stationary so that further rotation of spindle 34, see Fig. 1, will positively drive the inner disc 30 (through meshing gears 30, 32), which positive movement is possible by the slippage between pinion 13 and collar 38 (with respect to the stationarily held outer disc) and between pinions 23 and drive pinion 33 (with respect to the stationarily held middle disc 20). Positive driving of the inner disc 30 continues until its depressed button 30r is locked in the gap 27 separating contact segments 28, 29 of the stationarily held middle disc 20. This rotation results in the further movement of the load of 10° so that the aggregate load movement is 60° plus 30° plus 10° or 100° as required.

Associated with the control buttons of the inner, middle, and outer discs are respective button-locking means which are conveniently shown in the form of flat rings designated respectively 16 (associated with the outer disc 10), 26 (associated with the middle disc 20), and 36 (associated with the inner disc, 30). A detail of the button locking rings 16, 26, 36 is shown in Figs. 3, 4, 5, and Figs. 7, 8, in connection with the locking ring 36 associated with the inner disc 30. Locking ring 36 as shown in the detail figures, is provided with a plurality of apertures 36a through which the mounting bushing 39 of the button 38 clears. The locking apertures, 36a for example, are somewhat larger than the outside diameter of the bushing as is seen in the sectional views of Figs. 3–5 and in plan in Fig. 7. The locking rings are mounted for a slight extent of rotary movement shown in the sectional views of Figs. 3–5 as a left to right movement. The peripheral edge portion of the locking rings may be guided by tabs, such as 20t, Fig. 8, secured to the edge of the control disc, such as 20. The locking rings are provided with tension springs, such as the spring 36s in the detail figures, one end of which is secured to the locking rings, and the other end anchored to the control disc, as is shown in Fig. 3 at 36'. The locking rings, such as 36 in Fig. 3 is provided with an opening, 36c, see also Fig. 7, through which the tension spring 36s passes. Tension spring 36s normally urges the locking ring in a rightward direction as viewed in Fig. 3, in which position of the locking ring, the leftmost edge of the locking aperture 36a underlies a beveled edge 6b of the button shell 6 to impositively retain the shell 6 in elevated position as shown in Fig. 3. Just above the beveled edge 6b of the button shell 6 is provided an annular groove 6g which is slightly larger than the thickness of the locking ring 36, and is effective to receive the latter therein, as shown in Fig. 4 and as will be more fully explained.

In addition to the aforementioned compression spring 4, a weaker compression spring 3 is disposed in underlying relation to the flange 5' of the button spindle 5, the lower end of which is seated in an annular cavity provided therefor in the button bushing 39. The stronger compression spring 4 is of such length that it is uncompressed in the elevated position of the button shell 6 as shown in Fig. 3. In this uncompressed condition of the stronger spring 4, the compression spring 3 is effective to raise the button spindle 5 to the elevated positions shown in Fig. 3 in which position its pointed end $5x$ is out of engagement with the conducting elements of the underlying control disc.

When a selected button is depressed by finger pressure upon its button shell 6, downward movement of the shell will cause, by camming action between its beveled edge $6b$ and the retaining edge of the locking aperture $36a$, a leftwardly movement of the locking ring, which movement will cause the release of any other button that may have been depressed position, and will at the same time lock the particular button that is depressed. Continued downward movement causes the locking ring 36, spring urged rightwardly by the spring 38, as already explained, to snap into the annular groove $6g$ to lock the button in depressed position, as shown in Fig. 4, with the pointed end $5x$ in engagement with the underlying conducting segment. The point end $5x$ of the button is maintained in engagement with the conducting segment by the stronger spring 4, which is, as shown in Fig. 4, in compressed condition by reason of the locking of the button shell 6 by locking ring 36.

The mechanical version of the improved positioning device is shown in Figs. 9–12. The mechanical positioning device, like the electrical one described above with reference to Figs. 1 to 8, comprises three discs, namely, an outer disc 60, a middle disc 70, and an inner disc 80. The extent to which respective ones of the discs 60, 70, 80 move the load has been reversed from that shown in connection with the electrical form of Figs. 1–8, in that the outer disc 60 is provided to cause small load movements, and the inner disc 80, the largest increments of load movement. The buttons of the mechanical modification are similar in most respects to the buttons described in connection with the electrical form of the invention. The buttons associated with the outer disc 60 are carried on a platform 61 which, as best shown in Fig. 9 is in the form of an inwardly directed flange spaced above the disc proper. The buttons of the middle disc 70 are similarly borne by a platform 71 which is also formed as a spaced flange. It will be seen from Fig. 10 that the button platform 61 of the outer disc 60 is of smaller angular extent than that of the platform 71 associated with the middle disc 70; this is for the reason that buttons are required on the outer disc for only an angular extent equal to the increments of load movement of the middle disc 70; the platform of the middle disc 70 is of greater angular extent than that of the outer disc 60, because the buttons of the middle disc are assigned for positioning the load at points between the increment of load movement of the inner disc 80 which is, as mentioned above, of greater value than that of the other discs. The inner disc 80 has a similar platform 81 which is also in the shape of a flange, but differs from the platforms of the other two discs in that it is in the form of a complete circle, as best shown in Fig. 10; this is for the reason that the total increments of load movement of the inner disc is equal to 180° of a circle and for the further reason that such increment buttons are provided for load movement in both directions. Similarly the buttons on the outer platform 61 and on the middle platform 71 are provided for load movement in both directions.

The buttons of the inner disc 80 are provided for load movement or increment of 90°, for which purpose the disc is provided with four buttons designated $80a$, $80b$, $80a'$, $80b'$; button $80b$ is manipulated, in a manner more fully described presently, for a clockwise movement of 90° and button $80b'$ is manipulated for a load movement of 90° in a counter-clockwise direction. The middle disc 70 is designed for load movements of 30° for which purpose the inner disc is provided with seven buttons, the middle one being designated $70m$, and the others $70n$, $70p$, $70q$ (for counter-clockwise movement). It is thus seen that the 90° load movement of the inner disc 80 is divided into three increments each of 30°, by the four buttons of the middle disc included within 90° of a circle.

The buttons of the outer disc 60 are designed for load movement of 7½ degrees, for which reason the 30° increment of the middle disc 70 is divided into four increments, each of 7½ degrees by the buttons of the outer disc. The latter buttons, in addition to the center button $60r$, are designated $60s$, $60t$, $60u$, $60v$ (for clockwise rotation) and $60s'$, $60t'$, $60u'$, $60v'$ (for counter-clockwise load movement).

As best seen in Fig. 9, the peripheral portion of the middle disc 70 is interposed between the outer disc 60 and its flanged platform 61; likewise, the peripheral portion of the inner disc 80 is interposed between the middle disc 70 and its flanged platform 71. Interposed between the inner disc 80 and its flanged platform 81 is a disc 40 which is secured to the frame of the machine by an extension thereof 41, the outer end of which is secured, as best shown in Fig. 9, to the machine frame.

A detailed drawing of the buttons is shown in Fig. 11. The buttons, such as button $70r$, shown in Fig. 11, comprise a bushing 73. The lower end of this bushing is reduced to provide a shoulder, the reduced portion being received in an aperture provided therefor in the control disc 70.

Slidable within the bushing 73 is a spindle 75, the lower end of which is tapered to provide a point $75^x$. The upper portion of the bushing 70 has an enlarged cavity within which is slidably received the shank $76'$ of a button 76; the upper end of spindle 75 is threaded to be screwed into the shank portion $76'$. Interposed between the shank portion $76'$ and the seat of the cavity in bushing 73 and encircling the extended end of spindle 75, is a coil compression spring 77 which tends to urge the button 76 together with the spindle 75 outwardly to elevate the spindle tip $75^x$ from the underlying control disc, which in Fig. 11 is shown to be the outer disc 60. Outward or elevational movement of the button and its spindle 75 is limited by a collar $75c$ secured to the spindle 75 and which is abuttable with the underside of the bushing 73.

The peripheral edge of the middle disc 70 is provided with a radial groove 72 (Fig. 9) in which may be received the pointed end $75^x$ of the buttons $60s$, $60t$, $60u$, etc. of the outer disc 60. Similarly, the peripheral portion of the inner disc 80 is provided with a radial extending groove 82 in which may be received the spring pressed end $75^x$ of the buttons $70m$, $70p$, etc. of the middle disc 70. The stationary disc 40 is likewise provided with a radially extending groove 42 in which the pointed end 75ˣ of the buttons 80a, 80b, etc. of the inner disc 80 are received.

The outer disc 60 is secured to rotate with the load spindle 62, as shown in Fig. 9. The middle and inner discs 70, 80 are mounted to rotate about the said spindle. As clearly shown in Fig. 9, a hub 74 of the middle disc is interposed between the hub 64 of the outer disc and the hub 84 of the inner disc.

As an example, let it be assumed that the grooves 82 and 72 of the inner and middle discs 80 and 70 are aligned with the groove 42 of the stationary disc 40 and that all grooves are disposed on the line A—A of Fig. 10. Button 80a of the inner disc 80, button 70m of the middle disc 70, and button 60r of the outer disc are aligned on line A—A, the pointed ends 75ˣ of their spring pressed spindle 75 (see Fig. 11) being opposite the respective grooves, respectively, groove 42 of the stationary disc 60, groove 82 of the inner disc 80, and groove 72 of the middle disc 70. Button 80b is depressed to put coil spring 77 in compression sufficient to repel spindle 75 outwardly when the button reaches the groove 42 of the underlined stationary disc 40. Held in this depressed condition, button 80b is turned in a clockwise direction together with its disc 80, which movement is stopped by the snapping of the spring pressed spindle 75 into the underlined groove 42 of the stationary disc 40. The said clockwise movement of the inner disc 80 results in a clockwise movement of its groove 82, which will now be 90° advanced, clockwise from the starting line A—A of Fig. 10. Button 70n is then depressed and turned in the same clockwise direction until its snaps into the groove 82 of the inner disc 80, which underlies the buttons of the middle disc 70: inasmuch as groove 82 has been advanced 90° from the starting line A—A, the turning of button 70n will turn its middle disc 70 clockwise through an angle of 90° plus 30°, or a total of 120°. This 120° clockwise turning of the middle disc will result in a clockwise movement of its groove 72, the same angular extent from the starting line A—A. Finally, the button 60t, of the outer disc 60, which button is displaced 15° from the starting line A—A, is moved in a clockwise direction until the depressed button snaps in the groove 72 of the aforesaid advanced middle disc 70, resulting in a total displacement of the button 60t and the outer disc 60 of 120° plus 15°, or 135°. The outer disc 60 being secured to the load shaft 62, the load is moved an angle of 135° by movement of the depressed button of the outer disc.

The buttons of the various discs may be secured to their respective discs at selective predetermined positions, depending on the desirable extent of load movements required. For this purpose, the inner disc 80, middle disc 70 and outer disc 60 are provided with arcuate slots, respectively 88, 78, and in the case of the outer disc 60 two arcuate grooves 68, 69. The bushing 73, Fig. 11, of the buttons is provided with a flattened reduce portions, which is received in the arcuate groove 78, in the case of the buttons associated with the middle disc 70 (and the other designated arcuate slots in the case of the buttons of the other discs). The button bushing 73 is secured in place on the control disc 70 (in Fig. 11) by an upper locking nut 9 which nut 9 is disposed above the control disc and a lower locking nut 8, which underlies the control disc. The locking nuts may be provided with notches such as 9n, as shown in Fig. 12, for a spanner wrench.

What is claimed as new and desired to be secured by Letters Patents is:

1. A control apparatus for placing a load in a selected one of a plurality of predetermined positions, comprising a plurality of selectors, each selector including a pair of conducting members separated by a gap and a plurality of plungers constructed to be selectively depressed for engagement with the conducting members of the respective selector; a plurality of movable members mounted for rotation independently of each other, each of said members supporting the pair of conducting members of one selector and the plungers of the preceding selector, a motor operatively connected with the movable members for rotating the same; and circuit means including the conducting member engaged by the selected plunger, the selected plunger and the motor for causing the motor to rotate the selector with a depressed plunger until the said depressed plunger engages the corresponding gap, thereby disconnecting the circuit and locking a depressed plunger of a selector in the gap thereof, the position of the gap of the next succeeding selector being correspondingly advanced, the total movement of the last selector being equal to the sum total of the individual selectors, the last selector being operatively connected to the load.

2. A control apparatus for placing a load in a selected one of a plurality of predetermined positions, comprising a plurality of selectors, each selector including a pair of conducting members separated by a gap; a plurality of plungers constructed to be selectively manually depressed for engagement with the conducting members of the respective selector; yieldable means to retain a depressed plunger in engagement with the respective conducting member; a plurality of movable members mounted for rotation independently of each other, each of said members supporting the pair of conducting members of one selector and the plungers of the preceding selector, a motor operatively connected with the movable members for rotating the same; and circuit means including the conducting member engaged by the selected plunger, the selected plunger and the motor for causing the motor to rotate the selector with a depressed plunger until the said depressed plunger reaches the corresponding gap, thereby disconnecting the circuit, each first portion having a depression in the gap for mechanically retaining a depressed plunger, thereby locking a depressed plunger of a selector in the gap thereof, the position of the gap of the next succeeding selector being correspondingly advanced, the total movement of the last selector being equal to the sum total of the movements of the individual selectors, the last selector being operatively connected to the load.

3. A control apparatus for placing a load in a selected one of a plurality of predetermined positions, comprising a plurality of selectors, each selector including a pair of conducting members separated by a gap; a plurality of plungers constructed to be selectively depressed for engagement with the conducting members of the respective selector; a plurality of movable members mounted for rotation independently of each other, each of said members supporting the pair of conducting members of one selector and the plungers of the preceding selector, a motor operatively connected with the movable members for rotating the same; and circuit means including the conducting member engaged by the selected plunger, the selected plunger and the motor for causing the motor to rotate the selector with a depressed plunger until the said depressed plunger engages the corresponding gap, thereby disconnecting the circuit and locking a depressed plunger of a selector in the gap thereof, the position of the gap of the next succeeding selector being correspondingly advanced, the total movement of the last selector being equal to the sum total of the individual selectors, the last selector being operatively connected to the load; the motor being operatively connected to the second portion of the last selector and impositively connected to the portions of intermediate selectors, the first portion of the first selector being stationary.

4. A control apparatus for placing a load in a selected one of a plurality of predetermined positions, comprising a plurality of selectors, each selector including a pair of conducting members separated by a gap and a plurality of plungers constructed to be selectively depressed for engagement with the conducting members of the respective selector; a plurality of movable members mounted for rotation independently of each other, each of said members supporting the pair of conducting members of one selector and the plungers of the preceding selector, a motor operatively connected with the movable members for rotating the same; and circuit means including the conducting member engaged by the selected plunger, the selected plunger and the motor for causing the motor to rotate the selector with a depressed plunger until the said depressed plunger engages the corresponding gap, thereby controlling the circuit for stopping of the motor and locking a depressed plunger of a selector, the position of the gap of the next succeeding selector being correspondingly advanced, the total movement of the last selector being equal to the sum total of the individual selectors, the last selector being operatively connected to the load.

5. A control apparatus for placing a load in a selected one of a plurality of predetermined positions, comprising a plurality of selectors, each selector including a pair of conducting members separated by a gap; a plurality of plungers constructed to be selectively depressed for engagement with the conducting members of the respective selector; a plurality of movable members mounted for rotation independently of each other, each of said members supporting the pair of conducting members of one selector and the plungers of the preceding selector, a motor operatively connected with the movable members for rotating the same; and circuit means including the conducting member engaged by the selected plunger, the selected plunger and the motor for causing the motor to rotate the selector with a depressed plunger until the said depressed plunger engages the corresponding gap, thereby controlling the circuit for stopping of the motor and locking a depressed plunger of a selector, the position of the gap of the next succeeding selector being correspondingly advanced, the total movement of the last selector being equal to the sum total of the individual selectors, the last selector being operatively connected to the load; the motor being operatively connected to the second portion of the last selector and impositively connected to the portions of intermediate selectors, the first portion of the first selector being stationary.

MICHEL N. YARDENY.

REFERENCES CITED

The following references are of record in the file of this patent:

UNITED STATES PATENTS

| Number | Name | Date |
|---|---|---|
| 1,834,272 | Enderwood | Dec. 1, 1931 |
| 2,069,627 | Schwarzhaupt | Feb. 2, 1937 |
| 2,233,113 | Smith, Jr. | Feb. 25, 1941 |
| 2,247,165 | Crise | June 24, 1941 |
| 2,270,176 | Lammeren et al. | Jan. 13, 1942 |